(12) United States Patent
Nagashima

(10) Patent No.: US 7,006,584 B1
(45) Date of Patent: Feb. 28, 2006

(54) DEMODULATOR AND DEMODULATING METHOD FOR MOBILE PHONE

(75) Inventor: Katsuya Nagashima, Saitama (JP)

(73) Assignee: NEC Corporation, Tokyo (JP)

( * ) Notice: Subject to any disclaimer, the term of this patent is extended or adjusted under 35 U.S.C. 154(b) by 691 days.

(21) Appl. No.: 09/609,532

(22) Filed: Jun. 30, 2000

(30) Foreign Application Priority Data

Jul. 1, 1999 (JP) ................................. 11/187756

(51) Int. Cl.
*H04L 27/14* (2006.01)
(52) U.S. Cl. ...................... 375/324; 375/232; 375/330; 329/304
(58) Field of Classification Search ................ 375/316, 375/324, 327, 329, 330–332, 344, 345, 232; 329/300–372; 370/206
See application file for complete search history.

(56) References Cited

U.S. PATENT DOCUMENTS

| | | | | |
|---|---|---|---|---|
| 5,260,975 A | * | 11/1993 | Saito | 375/327 |
| 5,511,097 A | * | 4/1996 | Tsumura | 375/324 |
| 5,550,506 A | * | 8/1996 | Tsumura | 329/304 |

FOREIGN PATENT DOCUMENTS

| | | |
|---|---|---|
| JP | 63-272171 A | 11/1988 |
| JP | 06-205062 | 7/1994 |
| JP | 6-268704 A | 9/1994 |
| JP | 06-276242 | 9/1994 |
| JP | 7-221676 A | 8/1995 |
| JP | 08-32640 | 2/1996 |
| JP | 8-316883 A | 11/1996 |
| JP | 9-18534 A | 1/1997 |

* cited by examiner

*Primary Examiner*—Young T. Tse
*Assistant Examiner*—Edith Chang
(74) *Attorney, Agent, or Firm*—Sughrue Mion, PLLC

(57) ABSTRACT

A demodulator and a demodulating method for a mobile phone are provided. In particular, the present invention can simultaneously perform operation of improving the demodulation error rate caused by such as noise and external feedback loop operation being correction after detected, and can reduce the current consumption by restraining the increase of the process time at the simultaneous operation with an external correction circuit after detected, and can improve the CN ratio (ratio between carrier power and noise power). The present invention provides a received error rate improving means which improves the received error rate by weighting for differences at symbols before and after a symbol to be demodulated at the present time and applying feedback for symbols, a weighting means for applying weighting for correction values after detected of external another loop, a deciding the order of priority means for deciding the order of priority for plural correction values, and an adapting itself to various radio wave environment and the kinds of noise by using the weighting means and the deciding the order of priority means.

19 Claims, 1 Drawing Sheet

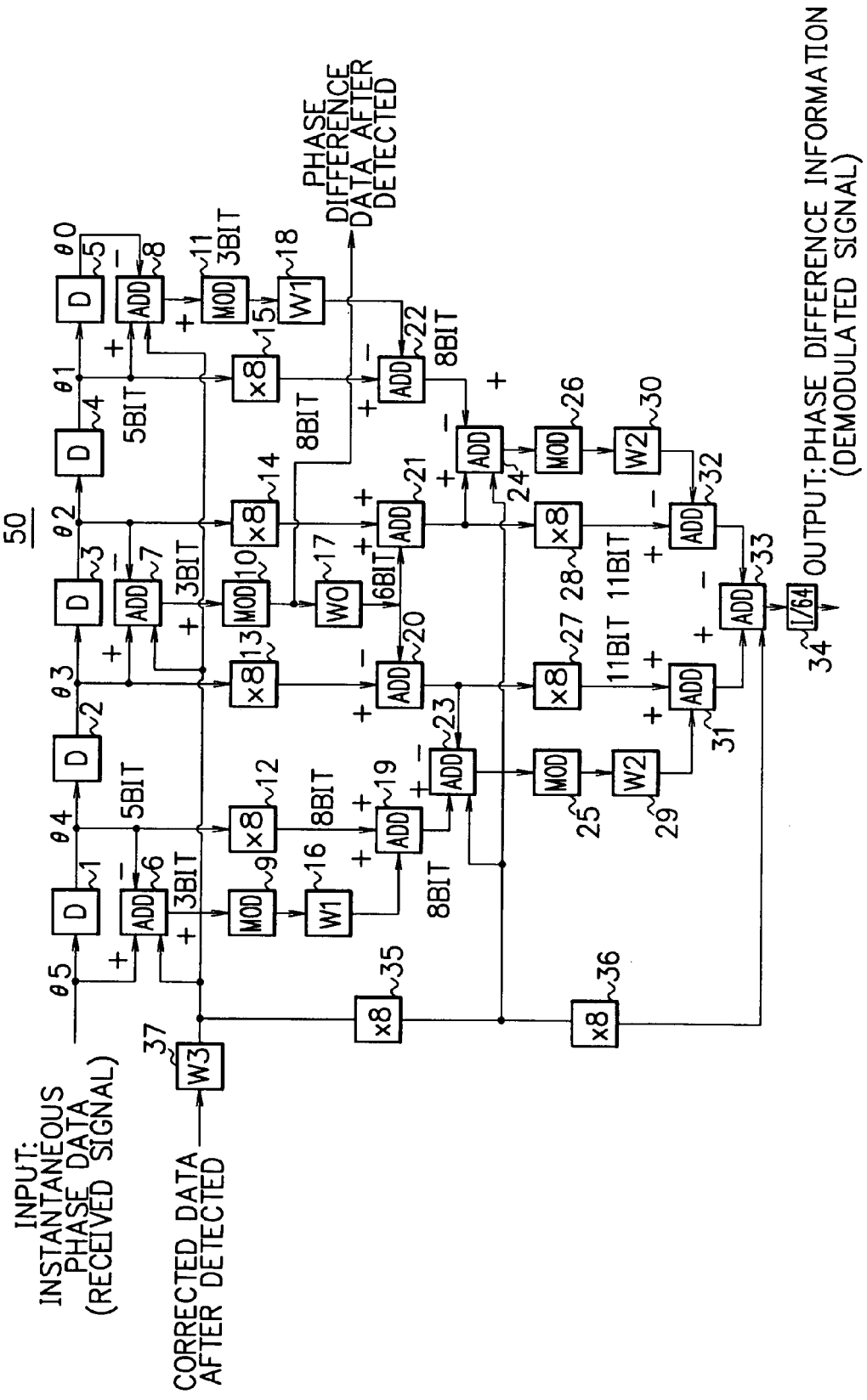

DEMODULATOR AND DEMODULATING METHOD FOR MOBILE PHONE

BACKGROUND OF THE INVENTION

The present invention relates to a demodulator and a demodulating method suitable for a mobile phone such as a cellular phone. In particular, the present invention can simultaneously perform operation of improving the demodulation error rate caused by such as noise and external feedback loop operation being correction after detected, and can reduce the current consumption by restraining the increase of the process time at the simultaneous operation with an external correction circuit after detected, and can improve the CN ratio (ratio between carrier power and noise power).

DESCRIPTION OF THE RELATED ART

At a conventional demodulator for a digital cellular phone, after phase values of inputted digital signals whose phases are modulated are delayed by one symbol each, the phase comparison between these delayed values and the inputted phase values are performed. And it is detected that the absolute values of these compared results are $\frac{1}{2}\pi$ or more. In this, $2\pi$ is the clock cycle. The detected signals being $\frac{1}{2}\pi$ or more are supplied to a digital phase locked loop (DPLL) circuit, and demodulation symbol clocks and clocks for demodulation data are generated. And these demodulation symbol clocks and clocks for demodulation data are supplied to a decoding section, and the demodulated data are obtained. At this kind of conventional demodulator, this one symbol delaying section consists of delayed flip flop circuits (DFFs), and in order to obtain required resolution for symbols at extracting clocks, needed steps of DFFs are required. And when steps of a shift register is made to reduce by lowering a clock frequency of the shift register and the one symbol delaying section consists of this shift register, the resolution at the extracting clocks becomes low.

Japanese Patent Application Laid-Open No. HEI 6-276242 discloses a demodulator for a digital cellular phone. This demodulator consists of a one symbol delaying means to which phase modulated digital signals are inputted, a phase difference detecting means which compares phase values outputted from this one symbol delaying means with phase values of the inputted signals, an absolute value detecting means which obtains the absolute values of the outputs from the phase difference detecting means, a more than $\frac{1}{2}\pi$ detecting means which detects more than $\frac{1}{2}\pi$ signals from this absolute value detecting means, a digital phase locked loop circuit (DPLL) which generates demodulation symbol clocks and clocks for demodulation data based on the signals detected at the more than $\frac{1}{2}\pi$ detecting means, and a decoding means which generates demodulated data based on the demodulation symbol clocks and the clocks for demodulation data. The one symbol delaying means provides a shift register to which the phase values of the inputted digital signals are inputted and a counter that supplies shift clocks to this shift register. This counter generates plural clocks whose phases are different respectively by making the frequency of the master clock divide at timing multiplied one symbol by integer. The demodulator for digital cellular phone makes the counting operation stop by one clock of the master clock at each counting cycle. According to this demodulator for digital cellular phone, the size of gates can be reduced by reducing the shift steps of the one symbol delaying section without lowering the performance. And the structure of the demodulator can be simplified.

And Japanese Patent Application Laid-Open No. HEI 8-32640 discloses a demodulator. The object of this demodulator is to reduce the deterioration of the error rate without using the error correction codes at a demodulator used delayed detection circuits. And at this conventional demodulator, digital modulated signals are received and demodulated signals are obtained by applying the delayed detection to the received signals. This demodulator consists of a plurality of a first means that provides a delaying means which receives inputted signals and obtains delayed signals by making the received inputted signals delay by a predetermined time, a delayed detection means which obtains delayed detection signals by applying the delayed detection to the inputted signals and the delayed signals, and an output signal generating means which generates output signals based on the delayed detection signals and the delayed signals, a second means which obtains detected result signals by further applying delayed detection to output signals obtained at the first means, and a demodulating means which generates demodulated signals from the detected result signals. The output signal generating means provides a third means which obtains differences by judging the delayed detection signals, a fourth means which obtains correction amounts by applying weighting with predetermined factors to the differences, and a fifth means which obtains output signals by correcting the delayed signals with using the correction amounts. The digital modulation signals are generated by applying a phase shift keying (PSK) modulation, and signals denoting phase changes generated based on the received signals are used as input signals. And a differential quadrature phase shift keying (DQPSK) modulation is used as the PSK modulation, the delayed detection means are subtracters, the delayed detection signals are phase deference signals denoting phase difference. The third means obtains differences between phase points obtained at the time when the phase difference signals are demodulated and the predetermined phase points. The second means provides a first delayed detection section which receives at least plural output signals and applies the delayed detection to each pair of the received signals sequentially and outputs a pair of the detected results whose detected result become a pair, and a second delayed detection section which obtains detected result signals by applying the delayed detection to the detected result pair. The first delayed detection section provides a sixth means which obtains differences by receiving one of the pair of output signals, a seventh means which obtains correction amounts by applying weighting with predetermined factors to the differences, and an eighth means which obtains the detected results by correcting the other of the pair of the output signals with the correction amounts. And at the demodulator, the digital modulated signals are generated by changing their time of data string based on a predetermined rule at a transmitting side. At this demodulator, at least one time phase correction is performed, therefore the error correction codes are not used, and the deterioration of the error rate can be improved without making information transfer rate lower. Furthermore, a transmitter and a receiver can be simplified because the error correction codes are not needed.

However, at the conventional demodulator, when a correction loop after detection is simultaneously used with an external correction loop after detection using for another object, there is a case that the correction values of these correction loops after detection are cancelled each other, this causes deterioration of its characteristic. And when these correction loops are connected in series, the processing time becomes long and the power ON time for processing circuits and central processing unit (CPU) becomes long, consequently, the demodulator is not suitable for the mobile phone. Therefore, there is a problem that a bad effect shortening standby time for the mobile phone which intermittently receives calls becomes large.

SUMMARY OF THE INVENTION

It is therefore an object of the present invention to provide a demodulator and a demodulating method which can simultaneously perform operation of improving the demodulation error rate caused by such as noise and external feedback loop operation being correction after detected, and can reduce the current consumption by restraining the increase of the process time at the simultaneous operation with an external correction circuit after detected, and can improve the CN ratio (ratio between carrier power and noise power).

According to a first aspect of the present invention, at a demodulator for a mobile phone, which can simultaneously perform operation of improving the demodulation error rate caused by such as noise and external feedback loop operation being correction after detected, and can reduce the current consumption by restraining the increase of the process time at the simultaneous operation with an external correction circuit after detected, and can improve the CN ratio (ratio between carrier power and noise power), the demodulator provides a received error rate improving means which improves the received error rate by weighting for differences at symbols before and after a symbol to be demodulated at the present time and applying feedback for symbols, a weighting means for applying weighting for correction values after detected of an external another loop, a deciding the order of priority means for deciding the order of priority for plural correction values, and an adapting itself to various radio wave environment and the kinds of noise by using the weighting means and the deciding the order of priority means.

According to a second aspect of the present invention, in the first aspect, the demodulator further provides a delay circuit and an adder for obtaining detected phase difference at the symbol point to be demodulated at the present time.

According to a third aspect of the present invention, in the first aspect, the modulator further provides delay circuits and adders for obtaining phase differences at symbol points before and after the symbol point to be demodulated at the present time.

According to a fourth aspect of the present invention, in the first aspect, the demodulator further provides operation circuits which obtain received quality being difference between each phase difference among symbols obtained at the delay circuits and the adders and an ideal value.

According to a fifth aspect of the present invention, in the fourth aspect, the adders input the received quality obtained at the operation circuits to detected phase value of each of the symbol points before and after the symbol point to be demodulated at the present time by feedback operation.

According to a sixth aspect of the present invention, in the first aspect, the demodulator further provides a dividing circuit which demodulates correctly with using outputs from the adders, in case that the detected phase difference at the symbol point to be demodulated includes difference by not detecting phase correctly.

According to a seventh aspect of the present invention, in the first aspect, the demodulator further provides weighting circuits which make feedback amounts attenuate in order to avoid divergence of operated results in case that the feedback amounts are large when the adders input the differences by the feedback operation.

According to an eighth aspect of the present invention, in the first aspect, the demodulator further provides logic circuits which perform bit expansion at input terminals of the adders and also perform bit expansion for values to be applied feedback and decrease round off error by omitting designated subordinate bits after all operation is finished and returning the number of bits to the original number.

According to ninth aspect of the present invention, at a demodulating method for a mobile phone, which can simultaneously perform operation of improving the demodulation error rate caused by such as noise and external feedback loop operation being correction after detected, and can reduce the current consumption by restraining the increase of the process time at the simultaneous operation with an external correction circuit after detected, and can improve the CN ratio (ratio between carrier power and noise power), the method provides the steps of, improving the received error rate by weighting for differences at symbols before and after a symbol to be demodulated at the present time and applying feedback for the symbols, applying weighting for correction values after detected of another loop, deciding the order of priority for plural correction values, and adapting itself to various radio wave environment and the kinds of noise by using the applying weighting process and the deciding the order of priority process.

According to a tenth aspect of the present invention, in the ninth aspect, the method further provides the step of delaying and adding signals for obtaining detected phase difference at the symbol point to be demodulated at the present time.

According to an eleventh aspect of the present invention, in the ninth aspect, the method further provides the step of delaying and adding signals for obtaining detected phase differences at before and after the symbol point to be demodulated at the present time.

According to a twelfth aspect of the present invention, in the ninth aspect, the method further provides the step of operating for obtaining received quality being difference between each phase difference among symbols obtained at the delaying and adding signals process and an ideal value.

According to a thirteenth aspect of the present invention, in the twelfth aspect, the adding signals process inputs the received quality obtained at the operation process to detected phase value of each of the symbol points before and after the symbol point to be demodulated at the present time by feedback operation.

According to a fourteenth aspect of the present invention, in the ninth aspect, the method further provides the step of dividing process which demodulates correctly with using outputs from the adding process, in case that the detected phase difference at the symbol point to be demodulated includes differences by not detecting phase correctly.

According to a fifteenth aspect of the present invention, in the ninth aspect, the method further provides the step of weighting process which makes feedback amounts attenuate in order to avoid divergence of operated result in case that the feedback amounts are large when the adding process inputs the difference by the feedback operation.

According to a sixteenth aspect of the present invention, in the ninth aspect, the method further provides the step of logic operating process which perform bit expansion at input terminals of the adding process and also perform bit expansion for values to be applied feedback and decrease round off error by omitting designated subordinate bits after all operation is finished and returning the number of bits to the original number.

BRIEF DESCRIPTION OF THE DRAWING

The objects and features of the present invention will become more apparent from the consideration of the following detailed description taken in conjunction with the accompanying drawing in which:

FIG. 1 is a block diagram showing a first embodiment of a demodulator of the present invention.

DESCRIPTION OF THE PREFERRED EMBODIMENTS

Referring now to the drawing, embodiments of the present invention are explained in detail. FIG. 1 is a block diagram showing a first embodiment of a demodulator of the present invention. The demodulator 50 of the present invention consists of delay circuits 1, 2, 3, 4, and 5, adders 6, 7, 8, 19, 20, 21, 22, 23, 24, 31, 32, and 33, operation circuits (shown MOD in FIG. 1) 9, 10, 11, 25, and 26, logic circuits 12, 13, 14, 15, 27, 28, 35, and 36, weighting circuits 16, 17, 18, 29, 30, and 37, and a divider 34.

The delay circuit 3 and the adder 7 obtain detected phase difference (changed amount of phase) at a symbol point to be desired to demodulate at the present time. The delay circuit 1 and the adder 6, the delay circuit 2 and the adder 23, the delay circuit 4 and the adder 24, and the delay circuit 5 and the adder 8 obtain detected phase difference at symbol points before and after the present time respectively.

The operation circuits 9 obtains received quality being difference between phase difference obtained at the delay circuit 1 and the adder 6, and an ideal value. The operation circuits 10 obtains received quality being difference between phase difference obtained at the delay circuit 3 and the adder 7, and an ideal value. The operation circuits 11 obtains received quality being difference between phase difference obtained at the delay circuit 5 and the adder 8, and an ideal value. The operation circuits 25 obtains received quality being difference between phase difference obtained at the delay circuit 2 and the adder 23, and an ideal value. The operation circuits 26 obtains received quality being difference between phase difference obtained at the delay circuit 4 and the adder 24, and an ideal value.

The adder 19 makes the received quality obtained at the operation circuit 9 to the detected phase value of each before and after the symbol point. The adder 20 makes the received quality obtained at the operation circuit 10 to the detected phase value of each before and after the symbol point. The adder 21 makes the received quality obtained at the operation circuit 10 to the detected phase value of each before and after the symbol point. The adder 22 makes the received quality obtained at the operation circuit 11 to the detected phase value of each before and after the symbol point. The adder 31 makes the received quality obtained at the operation circuit 25 to the detected phase value of each before and after the symbol point. The adder 32 makes the received quality obtained at the operation circuit 26 to the detected phase value of each before and after the symbol point.

At the operation circuits 9, 10, 11, 25, and 26, when the received quality obtained at the operation circuits 9, 10, 11, 25, and 26 is inputted to the detected phase value of each before and after symbol point, the plus and minus sighs become zero by canceling the difference at the adders 19, 20, 21, 22, 31, and 32.

When the detected phase difference (changed amount of phase) $\theta 2$, and $\theta 3$ at the symbol point to be desired to demodulate includes differences by not detecting phases correctly, the divider 34 demodulates correctly by using the output from the adder 33. With this, the deterioration of the demodulation error rate caused by such as noise is improved.

When the feedback amount is large in case that the feedback is applied to the difference at before and after the symbol points, the operated result diverges. In order to avoid this divergence, the weighting circuits 16, 17, 18, 29, and 30 attenuates the feedback amount.

In case that the feedback is applied to the difference at before and after the symbol points, values less than the decimal point are generated, the logic circuits 12, 13, 14, 15, 27, and 28 perform bit expansion at the input terminals of the adders and also performs bit expansion for values applied feedback. And after all operation is finished, the logic circuits make the number of bits return to the original number by deleting subordinate bits and make the round off errors lower. There are three methods to delete the subordinate bits, that is, round down, round up, and round off methods, any method can be applied. However, at the embodiment of the present invention, the round down method is applied.

For example, when the correction after detected such as automatic frequency control (AFC), which is mentioned in Japanese Patent Application Laid-Open No. HEI 6-205062, is performed, at the embodiment of the demodulator for a mobile phone of the present invention, the correction values are inputted to the adders 6, 7, 8, 23, 24, and 33, differences using for external various correction circuits after detected are also outputted from the adder 7. With this, the deterioration of the characteristic by canceling with the correction by the correction circuits after detected for another object is prevented. At this time, the logic circuits 35 and 36 perform the bit expansion for the correction values corresponding to positions of the adders 6, 7, 8, 23, 24, and 33. Consequently, without extending the process time, the simultaneous operation with the other external feedback loops for correction after detected can be performed.

In case that plural correction values after detected for the other loops exist, the weighting circuit 37 applies weighting for the correction values and decides the order of priority for the plural correction values. With this, the demodulator of the present invention can adapt itself to changes to the environment of radio waves and the kind of noise.

Next, a demodulating method for a mobile phone of the present invention is explained. Referring to FIG. 1, the detected phase difference (changed amount of phase) at a symbol point to be desired to demodulate at the present time is obtained at the delay circuit 3 and the adder 7. Further, the detected phase differences at symbol points before and after the present time are obtained at the delay circuit 1 and the adder 6, the delay circuit 2 and the adder 23, the delay circuit 4 and the adder 24, and the delay circuit 5 and the adder 8 respectively.

The difference between the phase difference among symbols and an ideal value, that is, received quality, is obtained at the operation circuits 9, 10, 11, 25, and 26, and the received quality is inputted to detected phase value of each symbol point before and after the present time by the feedback operation of the adders 19, 20, 21, 22, 31, and 32. The plus and minus signs at the feedback operation are made to zero by canceling the difference at the operation circuits 9, 10, 11, 25, and 26.

As a result, even when the detected phase difference (changed amount of phase) $\theta 2$, and $\theta 3$ at the symbol point to be desired to demodulate includes differences by not detecting phases correctly, the divider 34 can demodulate correctly by using the output from the adder 33. With this, the deterioration of the demodulation error rate caused by such as noise can be improved.

In this, the feedback operation is applied to the difference at the symbol points before and after the present time, therefore when the feedback amounts are large, the operated results diverge. In order to avoid this divergence, the feedback amounts are attenuated at the weighting circuits 16, 17, 18, 29, and 30 respectively. At this time, values less than the decimal point are generated, therefore the bit expansion is performed at the input terminal of each adder at the feedback operation, and the bit expansion is also applied to the values to which the feedback operation is applied at the logic circuits 12, 13, 14, 15, 27, and 28. And after all operation is finished, the logic circuits make the number of bits return to the original number by deleting subordinate bits and make the round off errors lower.

There are three methods to delete the subordinate bits, that is, round down, round up, and round off methods, any method can be applied. However, at the embodiment of the present invention, the round down method is applied.

For example, when the correction after detected such as AFC, which is mentioned in Japanese Patent Application Laid-Open No. HEI 6-205062, is performed, the correction values are inputted to the adders 6, 7, 8, 23, 24, and 33, differences using for various correction circuits after detected are also outputted from the adder 7. With this, the deterioration of the characteristic by canceling with the correction by the correction circuits after detected for another object is prevented. At this time, the logic circuits 35 and 36 perform the bit expansion for the correction values corresponding to positions of the adders 6, 7, 8, 23, 24, and 33. Consequently, without extending the process time, the simultaneous operation with the other feedback loops for correction after detected can be performed.

Further, in case that plural correction values after detected for the other loops exist, the weighting circuit 37 applies weighting for the correction values and decides the order of priority for the plural correction values. With this, the demodulator of the present invention can adapt itself to changes to the environment of radio waves and the kind of noise.

Next, a second embodiment of a demodulator of the present invention is explained. At the first embodiment, the operation is performed at total five symbols composed of one symbol to be desired to demodulate, and two each symbols before and after the one symbol. However, the number of symbols can be set freely, for example, three symbols or seven symbols can be set, and at these cases of the second embodiment, the same effect achieved at the first embodiment can be also achieved. And at the first embodiment, the weighting operation is performed by the weighting amounts of once, twice, four times, and eight times, therefore, the bit expansion is performed at three bits each. The weighting operation can be performed by any times of the weighting amount as the degree of freedom at the designing, and complex weighting operation can be realized by software. And an optimum weighting control in response to various radio wave environment and the kind of noise can be realized by controlling the weighting amounts, as a result, further stable received characteristic can be realized.

As mentioned above, according to the present invention, the present invention has several effects. First, the present invention can simultaneously perform operation of improving the demodulation error rate caused by such as noise and external feedback loop operation being correction after detected. Secondly, the present invention can reduce the current consumption by restraining the increase of the process time at the simultaneous operation with an external correction circuit after detected. And last, the present invention can improve the CN ratio (ratio between carrier power and noise power).

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A demodulator for a mobile phone comprising:
    a received error rate improving means which improves a received error rate by weighting differences of symbols before and after a current symbol to be demodulated and providing the weighted differences as feedback;
    a weighting means for applying weighting to one or more correction values provided from an external loop, wherein the correction values are generated after a detection of the current symbol; and
    a deciding means for deciding an order of priority for the one or more weighted correction values,
    wherein the demodulator is operable to adapt itself to various radio wave environments and different kinds of noise by using said weighting means and said deciding means.

2. A demodulator for a mobile phone in accordance with claim 1, further comprising:
    a delay circuit and an adder for obtaining a detected phase difference for said current symbol to be demodulated.

3. A demodulator for a mobile phone in accordance with claim 1, further comprising:
    delay circuits and adders for obtaining phase differences for the symbols before and after said current symbol to be demodulated.

4. A demodulator for a mobile phone in accordance with claim 3, further comprising:
    operation circuits operable to obtain a received quality as a difference between each respective phase difference between symbols obtained at said delay circuits and said adders and an ideal value.

5. A demodulator for a mobile phone in accordance with claim 4, wherein said adders input said received quality during the current symbol to be demodulated by using a feedback circuit.

6. A demodulator for a mobile phone in accordance with claim 3, further comprising:
    a dividing circuit operable to use outputs from said adders, in case that said detected obtained phase difference at said current symbol to be demodulated includes a difference generated by not detecting phase correctly.

7. A demodulator for a mobile phone in accordance with claim 3, further comprising:
    weighting circuits operable to attenuate feedback amounts to avoid a divergence of operated results in case that said feedback amounts are large when said adders input said weighted differences by a feedback circuit.

8. A demodulator for a mobile phone in accordance with claim 3, further comprising:
    logic circuits operable to perform bit expansion at input terminals of said adders and also perform bit expansion for values to be applied via feedback and decrease round-off error by omitting designated subordinate bits after all operation is finished and returning a number of bits to an original number.

9. A demodulating method for a mobile phone comprising:
  applying weighting to differences of symbols before and after a current symbol to be demodulated and providing the weighted differences as feedback;
  applying weighting to one or more correction values, wherein the correction values are calculated by an external loop inputted with phase difference data of the current symbol after detection of the current symbol; and
  deciding an order of priority for the one or more correction values,
  wherein various radio wave environments and different kinds of noise are accommodated by said applying weighting to the one or more correction values and said deciding the order of priority for the one or more correction values.

10. A demodulating method for a mobile phone in accordance with claim 9, further comprising:
  delaying and adding signals to obtain a detected phase difference at said current symbol to be demodulated.

11. A demodulating method for a mobile phone in accordance with claim 9, further comprising:
  delaying and adding signals to obtain a detected phase difference before and after said current symbol to be demodulated.

12. A demodulating method for a mobile phone in accordance with claim 10, further comprising:
  obtaining a received quality as a difference between each respective phase difference between symbols obtained during said delaying and adding and an ideal value.

13. A demodulating method for a mobile phone in accordance with claim 12, wherein said delaying and adding signals input said received quality during the current symbol to be demodulated by using feedback.

14. A demodulating method for a mobile phone in accordance with claim 11, further comprising:
  demodulating using results from said delaying and adding, in case that said detected phase difference at said current symbol to be demodulated includes a difference generated by not detecting phase correctly.

15. A demodulating method for a mobile phone in accordance with claim 11, further comprising:
  attenuating feedback amounts to avoid a divergence of operated results in case that said feedback amounts are large when said delaying and adding input said weighted difference by said feedback.

16. A demodulating method for a mobile phone in accordance with claim 11, further comprising:
  performing bit expansion on inputs of said delaying and adding and also performing bit expansion on values to be applied as feedback and decreasing round off error by omitting designated subordinate bits after all operations are finished and returning a number of bits to an original number.

17. A demodulator for demodulating digital symbol data comprising:
  a first weighting circuit that applies respective first weighting factors to one or more correction values generated by an external circuit;
  a detecting circuit that detects and outputs a difference between a current symbol and a delayed symbol; and
  a second weighting circuit that applies respective second weighting factors to the detected difference output from said detecting circuit,
  wherein said external circuit receives as an input the output of said detecting circuit.

18. A demodulator as claimed in claim 17 further comprising:
  a deciding circuit that determines an order of priority for the one or more weighted correction values.

19. A demodulator as claimed in claim 17 wherein the external circuit comprises an automatic frequency control circuit.

* * * * *